US008666073B2

(12) United States Patent
Wang et al.

(10) Patent No.: US 8,666,073 B2
(45) Date of Patent: Mar. 4, 2014

(54) SAFE HANDOVER METHOD AND SYSTEM (75) Inventors: Hongyan Wang, Shenzhen (CN); Yinxing Wei, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 130 days.

(21) Appl. No.: 13/148,374

(22) PCT Filed: Jul. 2, 2009

(86) PCT No.: PCT/CN2009/072598
§ 371 (c)(1),
(2), (4) Date: Aug. 8, 2011

(87) PCT Pub. No.: WO2010/094185
PCT Pub. Date: Aug. 26, 2010

(65) Prior Publication Data
US 2012/0106734 A1 May 3, 2012

(30) Foreign Application Priority Data
Feb. 20, 2009 (CN) .......................... 2009 1 0009558

(51) Int. Cl.
H04L 29/00 (2006.01)
(52) U.S. Cl.
USPC ............................. 380/247; 713/168; 455/433
(58) Field of Classification Search
USPC ............................. 380/247; 713/168; 455/433
See application file for complete search history.

(56) References Cited

U.S. PATENT DOCUMENTS

| 7,236,477 | B2 | 6/2007 | Emeott et al. | |
| 2006/0083200 | A1 | 4/2006 | Emeott et al. | |
| 2011/0078442 | A1* | 3/2011 | Gong et al. | 713/168 |

FOREIGN PATENT DOCUMENTS

| CN | 1482832 A | 3/2004 |
| CN | 101340708 A | 1/2009 |
| WO | WO 2006044251 A2 | 4/2006 |

OTHER PUBLICATIONS

English Translation of PCT International Preliminary Report on Patentability, including (1) Notification Concerning Transmittal of International Preliminary Report on Patentability and (2) Written Opinion of the International Searching Authority, for PCT/CN2009/072598, mailed Sep. 1, 2011 (5 pages).
English Translation of PCT International Search Report for PCT/CN2009/072598, mailed Nov. 26, 2009 (3 pages).

* cited by examiner

*Primary Examiner* — Brandon Hoffman
*Assistant Examiner* — Michael D Anderson
(74) *Attorney, Agent, or Firm* — Clark & Elbing LLP (57) ABSTRACT

The present invention provides a safe handover method and system which are applied in a handover process of a terminal in the next generation network, wherein the next generation network comprises a handover management module, an authentication server and a terminal. The safe handover method comprises: presetting initial safety parameters in the authentication server and the terminal, and generating safety parameters from the initial safety parameters; the handover management module obtaining the safety parameters; and the handover management module and the terminal interacting with each other by using the generated safety parameters to ensure a communication safety between the two communication parties. The present invention can ensure the communication safety between the terminal and the handover management module.

20 Claims, 5 Drawing Sheets

SAFE HANDOVER METHOD AND SYSTEM

CROSS-REFERENCE TO RELATED APPLICATIONS

This application is the U.S. National Stage filing under 35 U.S.C. §371 of International Application No. PCT/CN2009/072598, filed Jul. 2, 2009, which claims benefit of Chinese Patent Application No. 200910009558.5, filed Feb. 20, 2009.

FIELD OF THE INVENTION

The present invention relates to the communication field, in particular to a safe handover method and a safe handover system.

BACKGROUND OF THE INVENTION

Presently, the next generation network (NGN) can realize the access of a heterogeneous network, an inter-network roaming and a seamless inter-network handover. In the above, when mobile user equipment (UE, also referred to as a terminal) performs the inter-network handover, the terminal needs to communicate with a handover management module of the system.

In the currently adopted NGN, safety assurance does not exist between the terminal and the handover management module, that is, the system can not ensure the communication safety between the terminal and the handover management module. Therefore, a lot of safety problems exist in the communication between the terminal and the handover management module, for example, an unauthorized terminal can directly perform signaling data interaction with the handover management module, unencrypted mobile signaling may be intercepted, and the position of the terminal may be detected and the like.

When the terminal performs the inter-network handover, in order to ensure the privacy and the integrity of the signaling data and the user data between the terminal and an NGN network access point, and at the same time to make the NGN to ensure the continuity of the service, a safety mechanism is required to be established between the terminal and the handover management module. The safety mechanism herein comprises: ensuring the authentication safety between the terminal and the handover management module, and ensuring the confidentiality and the integrity of the interactive data between the terminal and the handover management module.

The handover management module currently can not obtain safety parameters related to the terminal, as a result, the authentication can not be performed between the terminal and the handover management module, and thus the safety mechanism can not be established between the terminal and the handover management module.

SUMMARY OF THE INVENTION

The present invention is put forward aiming at the problems in the prior art that the handover management module can not obtain the safety parameters related to the terminal, which results in that the authentication can not be performed between the terminal and the handover management module, and thus the safety mechanism can no be established. For this reason, the present invention aims at providing a safe handover method and a safe handover system to solve at least one of above-mentioned problems.

In order to achieve the purpose, a safe handover method is provided according to one aspect of the present invention, applied in a handover process of a terminal in a next generation network, wherein the next generation network comprises a handover management module, an authentication server and the terminal.

The safe handover method according to the present invention comprises: presetting initial safety parameters in the authentication server and the terminal, and generating safety parameters from the initial safety parameters; the handover management module obtaining the safety parameters; and the handover management module and the terminal interacting with each other by using the generated safety parameters to ensure a communication safety between the two communication parties.

Preferably, the step of the handover management module obtaining the safety parameters comprises one of the followings: the handover management module obtaining the safety parameters directly from the authentication server; and the handover management module obtaining the safety parameters from a mobile information management module, wherein the safety parameters in the mobile information management module are obtained from the authentication server.

Preferably, the interaction performed by the handover management module and the terminal by using the generated safety parameters comprises: an authentication process interacted between the handover management module and the terminal; integrity and/or confidentiality processes interacted between the handover management module and the terminal.

Preferably, the authentication process between the handover management module and the terminal comprises: the handover management module obtaining a first safety parameter from the authentication server, and receiving a second parameter from the terminal, wherein the second parameter comprises a first random number and a second safety parameter processed with the first random number; the handover management module authenticating the terminal according to the first safety parameter and the second parameter; and the terminal authenticating the handover management module according to a third parameter from the handover management module and a fourth safety parameter in the terminal under the condition that the terminal is successfully authenticated, wherein the third parameter comprises a second random number and a third safety parameter processed with the second random number; wherein the first safety parameter and the third safety parameter are generated according to the initial safety parameters in the authentication server, and the second safety parameter and the fourth safety parameter are generated according to the initial safety parameters in the terminal.

Preferably, the process of the handover management module authenticating the terminal comprises: the handover management module processing the first safety parameter according to the first random number, comparing the processing result with the second safety parameter processed with the first random number in the second parameter, and under the condition that the processing result and the second safety parameter are compared to be identical, determining that the terminal is successfully authenticated.

Preferably, the authentication process between the handover management module and the terminal comprises: the handover management module obtaining a first safety parameter from the authentication server, and transmitting a first parameter to the terminal, wherein the first parameter comprises a second random number and a first safety parameter processed with the second random number; the terminal receiving the first parameter, and authenticating the handover management module according to a second safety parameter and the first parameter; and the handover management module authenticating the terminal according to a fourth parameter from the terminal and a third safety parameter in the handover management module under the condition that the handover management module is successfully authenticated, wherein the fourth parameter comprises a first random number and a fourth safety parameter processed with the first random number; wherein the first safety parameter and the third safety parameter are generated according to the initial safety parameters in the authentication server, and the second safety parameter and the fourth safety parameter are generated according to the initial safety parameters in the terminal.

Preferably, the step of the terminal authenticating the handover management module comprises: the terminal processing the second safety parameter according to the second random number, comparing the processing result with the first safety parameter processed with the second random number in the first parameter, and under the condition that the processing result and the first safety parameter are compared to be identical, determining that the handover management module is successfully authenticated.

Preferably, the method further comprises: the terminal encrypting an authentication request message according to a second safety parameter; and the handover management module decrypting the authentication request message according to a second parameter in a received authentication request.

Preferably, the method further comprises: the terminal setting first additional data according to a second safety parameter and an authentication request message, and carrying the first additional data in an authentication request; and the handover management module setting second additional data according to the received second parameter and the authentication request message; wherein if the first additional data and the second additional data are identical, it represents that the authentication request is safe.

Preferably, a first safety parameter, a second safety parameter, a third safety parameter, or a fourth safety parameter comprises at least one of the followings: a cryptographic key, a cryptographic key life cycle, a cryptographic key algorithm and a cryptographic key protocol.

For achieving the above-mentioned purpose, a safe handover system is provided according to the other aspect of the present invention, which comprises a terminal, a handover management module, a mobile information management module and an authentication server, wherein initial safety parameters are preset in the authentication server and the terminal.

In the above, the handover management module comprises: an obtaining sub-module, configured to obtain a first safety parameter and a third safety parameter from the mobile information management module or the authentication server; a first receiving sub-module, configured to receive a second parameter from the terminal, wherein the second parameter comprises a first random number and a second safety parameter processed with the first random number; a first processing sub-module, configured to process the first safety parameter obtained by the obtaining sub-module according to the first random number in the second parameter received by the first receiving sub-module; a first comparison sub-module, configured to compare the processing result of the first processing sub-module with the second safety parameter processed with the first random number received by the first receiving sub-module; a first transmitting sub-module, configured to transmit a third parameter to the terminal, wherein the third parameter comprises a second random number and a third safety parameter processed with the second random number; and an invocation sub-module, configured to enable the first transmitting sub-module under the condition that the comparison result of the first comparison sub-module is that the processing result and the second safety parameter are identical;

the terminal comprises: a second transmitting sub-module, configured to transmit the second parameter to the handover management module; a second receiving sub-module, configured to receive the third parameter from the handover management module, wherein the third parameter comprise the second random number and the third safety parameter processed with the second random number; a second processing sub-module, configured to process a local fourth safety parameter according to the second random number in the third parameter received by the second receiving sub-module; a second comparison sub-module, configured to compare the processing result of the second processing sub-module with the third safety parameter processed with the second random number received by the second receiving sub-module; and a trigger sub-module, configured to trigger the system to establish a safety mechanism under the condition that the comparison result of the second comparison sub-module is that the processing result and the third safety parameter are identical;

the first safety parameter and the third safety parameter are generated according to the initial safety parameters in the authentication server; the second safety parameter and the fourth safety parameter are generated according to the initial safety parameters in the terminal.

Preferably, the terminal and the handover management module further comprise: an encryption sub-module, configured to encrypt data which need to be transmitted; and a decryption sub-module, configured to decrypt received data.

Preferably, the first safety parameter, the second safety parameter, the third safety parameter, or the fourth safety parameter comprises at least one of the followings: a cryptographic key, a cryptographic key life cycle, a cryptographic key algorithm and a cryptographic key protocol.

By virtue of the above-mentioned technical solutions, the handover management module can obtain, from the authentication server, the safety parameters generated from the initial safety parameters through presetting the initial safety parameters in the terminal and the authentication server; under the condition that the handover management module and the terminal are successfully authenticated with each other, the handover management module can establish a safety mechanism with the terminal based on the obtained safety parameters. Therefore, the present invention can overcome the problems that the handover management module can not obtain the safety parameters related to the terminal, as a result that the authentication between the terminal and the handover management module can not be performed and the safety mechanism can not be established. The present invention can ensure the communication safety between the terminal and the handover management module.

BRIEF DESCRIPTION OF THE DRAWINGS

The drawings illustrated here provide a further understanding of the present invention and form a part of the present application. The exemplary embodiments and the description thereof are used to explain the present invention without unduly limiting the present invention, wherein.

DETAILED DESCRIPTION OF EMBODIMENTS

General Description of Functions

In the current network handover process, the handover management module can not obtain the safety parameters related to the terminal, as a result, the safety mechanism can no be established between the terminal and the handover management module through the authentication process, thus the communication safety between the terminal and the handover management module can not be ensured. Based on this, the present invention provides an improved safe handover solution, which is applied in the handover process of the terminal in the next generation network. In the method, through setting the same initial safety parameters in the authentication server as that in the terminal, the handover management module can directly or indirectly obtain, from the authentication server, the safety parameters generated from the initial safety parameters, and the terminal and the handover management module can perform authentication with each other based on the obtained safety parameters; under the condition that the handover management module and the terminal are successfully authenticated with each other, the handover management module establishes a safety mechanism with the terminal, therefore the communication safety between the terminal and the handover management module can be ensured.

In the solution of the present invention, the safety parameters comprises a cryptographic key, a cryptographic key life cycle, a cryptographic key algorithm and a cryptographic key protocol, which can be generated from the initial safety parameters according to an EAP-AKA protocol, and specifically, the authentication server and the terminal can process the initial safety parameters according to a pre-determined function to generate the safety parameters. The pre-determined function can be, but is not limited to, either a hash function or a KDF (cryptographic key derivation function) function. The authentication server in the present invention can distribute the local generated safety parameters to other functional modules.

What needs to be explained is that the process of generating the safety parameters from the initial safety parameters in the present invention can refer to the process of generating cryptographic key from a root cryptographic key in the prior art. Because the initial safety parameters preset in the terminal and in the authentication server are identical and are processed with the same processing method by the terminal and by the authentication server, if the terminal is valid, the safety parameters respectively generated from the initial safety parameters in the terminal and in the authentication server shall be identical. In the prior art, if a plurality of cryptographic keys are generated from the root cryptographic key, the sequence that the cryptographic keys are to be respectively used by the system is certain, that is, the utilization sequences of the safety parameters in the terminal and in the authentication server are also identical. For example, four safety parameters are obtained after the initial safety parameters are processed by using the hash function, the utilization sequence of the four safety parameters is certain, and the four safety parameters respectively in the terminal and in the authentication server are in one-to-one correspondence according to the sequence and are identical, that is, when the authentication is performed, the terminal and the authentication server both know which safety parameter shall be used currently.

The present invention will be detailed hereinafter in connection with the embodiments and with reference to the drawings. What needs to be explained is that if there is no conflict, the embodiments in the application and the characteristics in the embodiments can be combined with each other.

Method Embodiments

A safe handover method is provided according to an embodiment of the present invention, which is applied in the handover process of the terminal in the next generation network, wherein the next generation network comprises a handover management module, an authentication server and a terminal. The safe handover method comprises: initial safety parameters are preset in the authentication server and the terminal, and safety parameters are generated from the initial safety parameters; the handover management module obtains the safety parameters; and the handover management module and the terminal interact with each other by using the generated safety parameters to ensure the communication safety between the two communication parties.

During specific implementation process, the handover management module obtains the safety parameters directly from the authentication server; or the handover management module obtains the safety parameters from a mobile information management module, wherein the safety parameters in the mobile information management module are obtained from the authentication server.

The interaction performed by using the generated safety parameters comprises an authentication process, and integrity and confidentiality processes of the interaction between the handover management module and the terminal.

Figure 1:
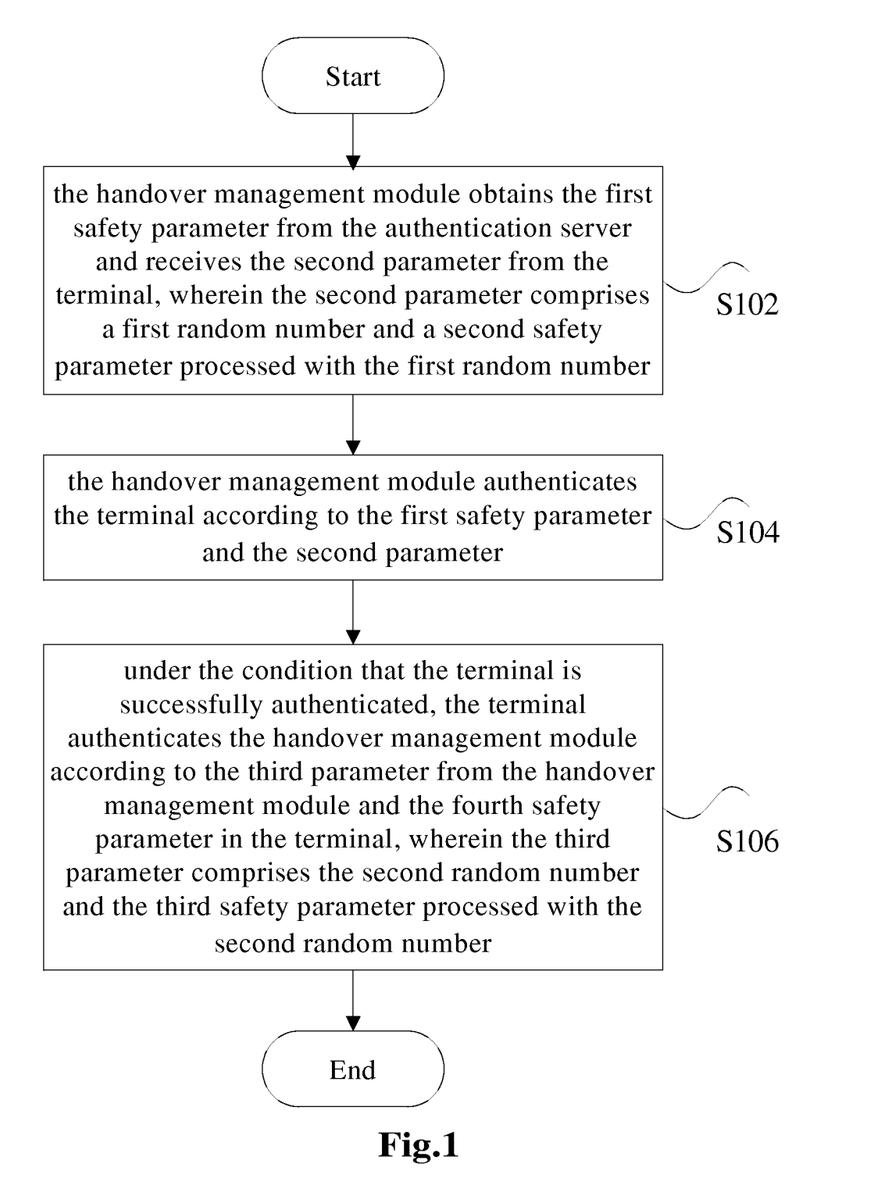
FIG. 1 is a flowchart of the authentication process of the safe handover method according to an embodiment of the present invention.

FIG. 1 is a flowchart of the authentication process in the safe handover method according to an embodiment of the present invention, wherein the first safety parameter and the third safety parameter are generated from the initial safety parameters in the authentication server, and the second safety parameter and the fourth safety parameter are generated from the initial safety parameters in the terminal. According to the description about the safety parameters, for the authentication server, the system firstly uses the first safety parameter, and then uses the third safety parameter; for the terminal, the system firstly uses the second safety parameter, and then uses the fourth safety parameter.

Under the condition that the handover is needed, as shown in FIG. 1, the authentication process comprises the steps S102 to S106 as follows.

Step S102, the handover management module obtains the first safety parameter from the authentication server and receives the second parameter from the terminal, wherein the second parameter comprises a first random number and a second safety parameter processed with the first random number. The first safety parameter obtained by the handover management module from the authentication server can be directly or indirectly obtained from the authentication server, wherein obtaining indirectly means that the handover management module obtains the first safety parameter from a mobile information management module, and the first safety parameter in the mobile information management is obtained from the authentication server in advance (the third safety parameter also can be obtained in the direct or indirect manner).

During specific implementation process, the processing for the second safety parameter comprises: the terminal generates a random number (viz. the first random number), and processes the second safety parameter and the first random number by using, but not limited to, an MD5 algorithm or an H-MAC algorithm. Therefore, in the transmission process, it can prevent the safety parameter from being obtained by an illegal person, and thus ensure the safety of the safety parameter.

Step S104, the handover management module authenticate the terminal according to the first safety parameter and the second parameter.

Specifically, the handover management module processes the first safety parameter according to the first random number (the processing procedure is the same as the above processing procedure of the second safety parameter), and compares the processing result with the second safety parameter processed with the first random number in the second parameter, under the condition that the comparison result is that they are identical, it is determined that the terminal is successfully authenticated.

In practical application, the process that the handover management module authenticates the terminal also can be: backward processing on the second safety parameter processed with the first random number in the second parameter is performed to obtain the second safety parameter, and if the first safety parameter and the second safety parameter are identical, it is determined that the terminal is successfully authenticated.

Step S106, under the condition that the terminal is successfully authenticated, the terminal authenticates the handover management module according to the third parameter from the handover management module and the fourth safety parameter in the terminal, wherein the third parameter comprises the second random number and the third safety parameter process with the second random number, and the second random number is randomly generated by the handover management module.

Specifically, the terminal processes the fourth safety parameter according to the second random number (the processing procedure is the same as the above processing procedure of the second safety parameter), and compares the processing result with the third safety parameter processed with the second random number in the third parameter, under the condition that the comparison result is that they are identical, it is determined that the handover management module is successfully authenticated.

Similar to step S104, the process that the terminal authenticates the handover management module also can be: backward processing on the third safety parameter processed with the second random number in the third parameter is performed to obtain the third safety parameter, and if the fourth safety parameter and the third safety parameter are identical, the handover management module is successfully authenticated.

Preferably, when the terminal needs to perform handover, the terminal can transmit an authentication request to the handover management module, and carry the second parameter (viz. the second parameter in step S104) and an authentication request message in the authentication request so as to transmit the second parameter to the handover management module. Under the condition that the terminal is successfully authenticated in step S104, in response to the authentication request message, the handover management module can transmit an authentication response to the terminal, and carry in the authentication response the third parameter (viz. the third parameter in step S106) which is used for subsequently performing authentication on the handover management module in the terminal. Detailed authentication process can be embodied in the above-mentioned steps S104 and S106.

In addition, except the authentication process, the safety mechanism also comprises the ensuring for the confidentiality and the integrity of the communication data between the terminal and the handover management module. The safety parameters obtained by the handover management module also can be used to protect the confidentiality and the integrity of the communication data between the terminal and the handover management module.

The ensuring for the confidentiality of the data can be realized through the following operations: the terminal encrypts the authentication request message according to the second safety parameter, and correspondingly the handover management module decrypts the authentication request message according to the second parameter in the received authentication request. In this way, the confidentiality of the authentication request message can be ensured. The specific operation comprises: the terminal performs encryption process to the authentication request message by using relevant cryptographic key information in the second safety parameter as one of the input parameters of cryptographic algorithm 1; correspondingly, when receiving the second parameter, the handover management module can obtain the second safety parameter according to the first random number in the second parameter (that is, performing the backward processing corresponding to the process of the second safety parameter performed with the first random number in step S102), and performs decryption process on the authentication request message according to the relevant cryptographic key information in the second safety parameter, therefore the protection for the confidentiality of the authentication request message can be realized.

The ensuring for the integrity of the data can be realized through the following operations: the terminal sets first additional data according to the second safety parameter and the authentication request message, and carries the first additional data in the authentication request; the handover management module outputs second additional data according to the received second parameter and the authentication request message; if the first additional data and the second additional data are identical, it represents that the authentication request is safe, that is, it represents that the authentication request message is not tampered and is integral. The specific operations comprise: the terminal outputs data with a fixed length by using the relevant cryptographic key information in the second safety parameter and the authentication request message as the input parameters of cryptographic algorithm 2, and transmits the data with the fixed length to the handover management module by carrying the data with the fixed length in the authentication request. Correspondingly, after receiving the authentication request, the handover management module obtains the second safety parameter through the processing in the above confidentiality protection, and outputs another data with a fixed length by using the relevant cryptographic key information in the second safety parameter and the authentication request message as the input parameters of cryptographic algorithm 2. If the output data with the fixed length is identical with the data with the fixed length in the authentication request, it represents that the authentication request message is not tampered, therefore the integrity of the authentication request message is ensured.

What needs to be explained is that the ensuring operation for the confidentiality and the integrity of the authentication request message also can be applied in the ensuring operation for the confidentiality and the integrity of an authentication response and of the data in other scenes.

In practical application, if the authentication for the terminal in step S104 is unsuccessful, then the step S106 is not needed to be performed, and the authentication process is ended. In addition, if the authentication for the handover management module in step S106 is unsuccessful, then the authentication process is ended.

It can be concluded from the above-mentioned descriptions that the handover management module obtains the safety parameters, which ensures the handover management module and the terminal can perform authentication with each other, therefore a safety mechanism can be established between the terminal and the handover management module, and the communication safety between the terminal and the handover management module can be ensured.

Figure 2:
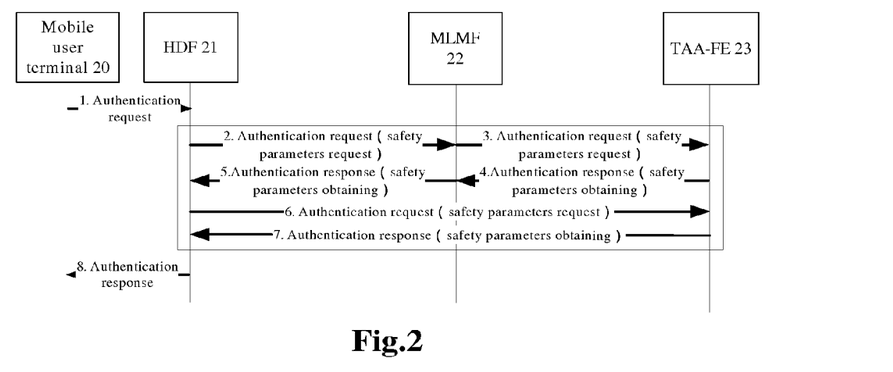
FIG. 2 is a schematic view of an intra-domain safe handover authentication process according to an embodiment of the present invention.

FIG. 2 is a schematic view of an intra-domain safe handover authentication process according to an embodiment of the present invention, wherein the random numbers are indicated as R1 (corresponding to the first random number) and R2 (corresponding to the second random number); in the terminal, the safety parameters generated from the initial safety parameters are indicated as A1, A2, A3, and A4; the safety parameters processed with R1 are indicated as R11 (A1 processed with R1), R12 (A2 processed with R1), R13 (A3 processed with R1), and R14 (A4 processed with R1); the safety parameters processed with R2 are indicated as R21 (A1 processed with R2), R22 (A2 processed with R2), R23 (A3 processed with R2), and R24 (A4 processed with R2); in the authentication server, the safety parameters generated from the initial safety parameters are indicated as B1, B2, B3, and B4; the safety parameters processed with R1 are indicated as R11' (B1 processed with R1), R12' (B2 processed with R1), R13' (B3 processed with R1), and R14' (B4 processed with R1); the safety parameters processed with R2 are indicated as R21' (B1 processed with R2), R22' (B2 processed with R2), R23' (B3 processed with R2), and R24' (B4 processed with R2); the handover management module can be a handover decision function module (HDF) 21, the mobile information management module can be a mobile location management function module (MLMF) 22, and the authentication server can be a transport authentication and authorization functional entity (TAA-FE) 23. As shown in FIG. 2, the process comprises the steps as follows.

Step 1, the terminal 20 transmits an authentication request to the handover decision function module 21, wherein the authentication request comprises R11 and R1.

Step 2, in response to the received authentication request, the handover decision function module 21 transmits the authentication request to the mobile location management function module 22, wherein the authentication request comprises a safety parameter obtaining request.

Step 3, in response to the received safety parameter obtaining request, the mobile location management function module 22 transmits the authentication request to the transport authentication and authorization functional entity 23, wherein the authentication request comprises the safety parameter obtaining request.

Step 4, in response to the received safety parameter obtaining request from the mobile location management function module 22; the transport authentication and authorization functional entity 23 transmits an authentication response to the mobile location management function module 22, wherein the authentication response comprises B1.

Step 5, the mobile location management function module 22 transmits the authentication response to the handover decision function module 21, wherein the authentication response comprises B1.

The steps 2 to 5 described above are the process that the safety parameters are indirectly obtained from the transport authentication and authorization functional entity 23. As for the process of obtaining the safety parameters directly from the transport authentication and authorization functional entity 23, it can be realized by the step 6 and step 7 as follows instead of the steps 2 to 5.

Step 6, the handover decision function module 21 transmits an authentication request to the transport authentication and authorization functional entity 23, wherein the authentication request comprises a safety parameter obtaining request.

Step 7, the transport authentication and authorization functional entity 23 transmits an authentication response to the handover decision function module 21, wherein the authentication response comprises B1; R11' is obtained after B1 is processed with R1, if R11 and the R11' are identical, it represents that the authentication performed for the terminal 20 by the handover decision function module 21 is successful, and step 8 will be performed, otherwise, the authentication process is ended.

Step 8, the handover decision function module 21 transmits the authentication response to the terminal 20, wherein the authentication response comprises R22' and R2; R22 is obtained after A2 is processed with R2, if R22' is equal to R22, it represents the authentication performed for the handover decision function module 21 by the terminal 20 is successful, and the system can establish a safety mechanism, otherwise, the authentication process is ended.

In steps 1 to 8, all communication data between the handover decision function module 21 and the terminal 20 need to be performed with the confidentiality and the integrity ensuring operation mentioned above, and the specific description will not be described herein.

In practical implementation process, the authentication process also can be initiated by the handover management module, that is, the handover management module firstly transmits parameters to the terminal so that the terminal can authenticate the handover management module. The authentication process comprises three steps as follows.

Step 1, the handover management module obtains a first safety parameter from the authentication server, and transmits a first parameter to the terminal, wherein the first parameter comprises a second random number and a first safety parameter processed with the second random number.

Step 2, the terminal receives the first parameter, and authenticates the handover management module according to a second safety parameter and the first parameter.

Step 3, under the condition that the handover management module is successfully authenticated, the handover management module authenticates the terminal according to a fourth parameter from the terminal and a third safety parameter in the handover management module, wherein the fourth parameter comprises a first random number and a fourth safety parameter processed with the first random number.

In the above, the first safety parameter and the third safety parameter are generated according to the initial safety parameters in the authentication server, and the second safety parameter and the fourth safety parameter are generated according to the initial safety parameters in the terminal.

Specifically, for the interactive authentication process between the terminal and the handover management module in local, the corresponding description of FIG. 1 can be referred to, and the details will not be described herein.

Figure 3:
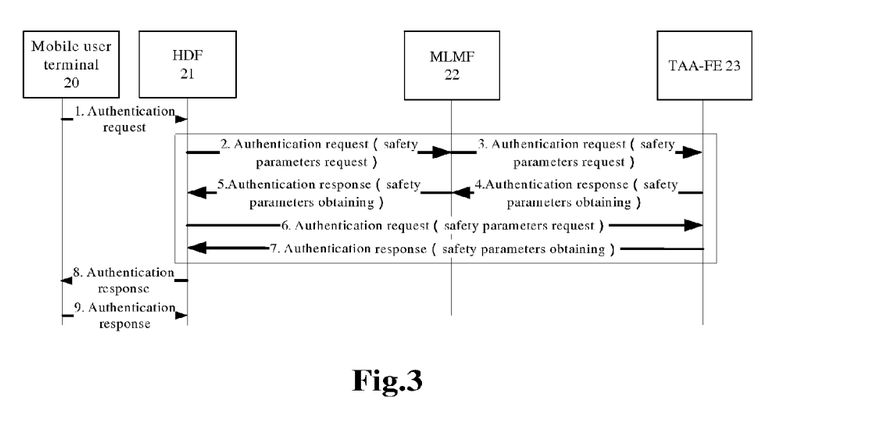
FIG. 3 is another schematic view of the intra-domain safe handover authentication process according to an embodiment of the present invention.

FIG. 3 is another schematic view of the intra-domain safe handover authentication process according to an embodiment of the present invention; the difference with the flow shown in FIG. 2 is that the safe handover authentication process shown in FIG. 2 is firstly initiated by the user terminal, while the safe handover authentication process shown in FIG. 3 is firstly initiated by the handover decision function module.

As shown in FIG. 3, the authentication request in step 1 shown in FIG. 2 comprises R11 and R1, while in FIG. 3, the authentication request transmitted to the handover decision function module by the terminal does not comprise R11 and R1.

In addition, the steps different from the steps shown in FIG. 2 also comprises:

Step 7, the transport authentication and authorization functional entity 23 transmits the authentication response to the handover decision function module 21, wherein the authentication response comprises a random number 1, and a parameter 1 generated by processing a safety parameter 1 with the random number 1;

Step 8, after receiving the authentication response, the terminal 20 generates a parameter 2 by using a safety parameter 2 of the terminal and the random number 1 in the authentication response; if the parameter 2 is identical with the parameter 1 in the authentication response, it represents that the authentication performed for the handover decision function module 21 by the terminal 20 is successful, and step 9 is performed, otherwise, the authentication process is ended;

Step 9, after the authentication performed for the handover decision function module 21 by the terminal 20 is successful, the terminal 20 transmits a random number 2 and a parameter 4 which is generated by processing a safety parameter 4 with the random number 2 to the handover decision function module 21; the handover decision function module 21 generates a parameter 3 by using a safety parameter 3 and the random number 2; if the parameter 3 and the parameter 4 are identical, it represents that the authentication performed for the terminal 20 by the handover decision function module 21 is successful.

Figure 4:
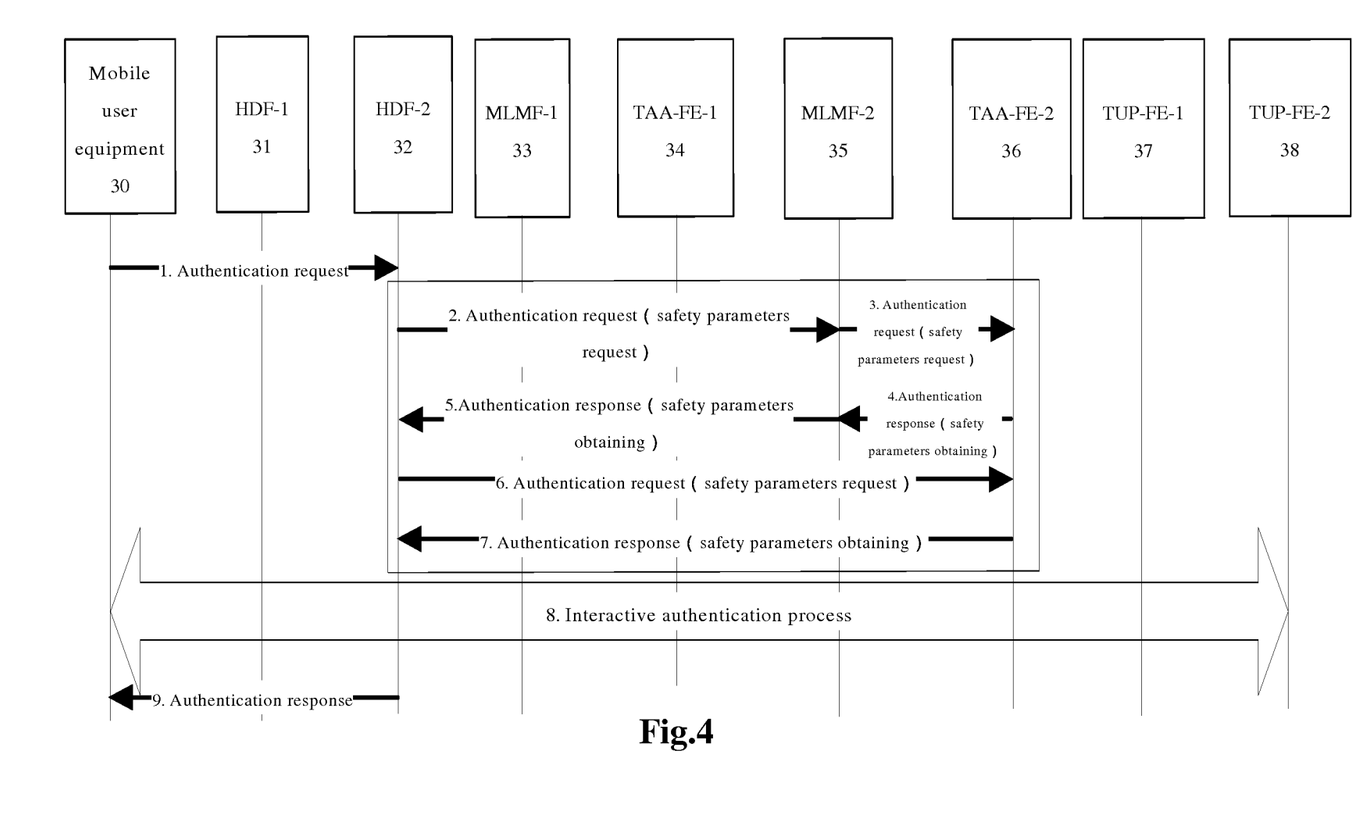
FIG. 4 is a schematic view of an inter-domain authentication process according to an embodiment of the present invention.

FIG. 4 is a schematic view of an inter-domain authentication process according to an embodiment of the present invention, and the process comprises the steps as follows.

Step 1, a terminal 30 initiates an authentication request to an objective handover decision function module 32 (HDF-2).

Step 2, the objective handover decision function module 32 transmits an authentication request to an objective mobile location management function module 35 (MLMF-2), wherein the authentication request comprises a safety parameter obtaining request.

Step 3, the objective mobile location management function module 35 transmits an authentication request to an objective transport authentication and authorization functional entity 36 (TAA-FE-2), wherein the authentication request comprises a safety parameter obtaining request.

Step 4, in response to the received authentication request from the mobile location management function module 35, the objective transport authentication and authorization functional entity 36 transmits an authentication response to the objective mobile location management function module 35, wherein the authentication response comprises a safety parameter (the safety parameter corresponds to the first safety parameter in step S102).

Step 5, the objective mobile location management function module 35 transmits an authentication response to the objective handover decision function module 32, wherein the authentication response comprises a safety parameter (viz. the safety parameter in Step 4).

Alternatively, similar to the flow in FIG. 2, in the above-mentioned steps 2 to 5, the objective handover decision function module 32 indirectly obtains the safety parameter from the objective transport authentication and authorization functional entity 36, optionally, the safety parameter also can be directly obtained from the objective transport authentication and authorization functional entity 36, and the direct obtaining process comprises the step 6 and step 7 as follows.

Step 6, the objective handover decision function module 32 transmits an authentication request to the objective transport authentication and authorization functional entity 36, wherein the authentication request comprises a safety parameter obtaining request.

Step 7, the objective transport authentication and authorization functional entity 36 returns the authentication response, wherein the authentication response comprises a safety parameter (the safety parameter corresponds to the first safety parameter in step S102); the objective handover decision function module 32 authenticates the terminal 30, and the authentication process has been described in detail in preceding text.

Step 8, the objective handover decision function module 32 transmits an authentication response to the terminal 30.

Step 9, the terminal 30 authenticates the objective handover decision function module 32, and the authentication process has been described in detail in preceding text.

In the above steps 1 to 9, all communication data between the handover decision function module 32 and the terminal 30 need to be performed with the confidentiality and the integrity ensuring operation, and the specific description will not be described herein.

What needs to be explained is that for the convenience of description, the technical solutions of the method embodiment of the present invention are shown and described in the form of steps in FIG. 1 to FIG. 4, and the steps shown in FIG. 1 to FIG. 4 can be performed in a computer system of a group of computers which can execute instructions. Though logical sequences are shown in FIG. 1 to FIG. 4, in certain cases, the shown or described steps can be performed in sequences different from the shown sequences herein.

It can be concluded from the descriptions that a safety mechanism is established between the terminal and the handover management module based on the safety parameter, therefore the privacy and the integrity of the signaling data and the user data in the communication process between the terminal and the handover management module can be ensured.

A computer readable medium is provided according to an embodiment of the present invention. Computer executable instructions are stored in the computer readable medium, and when the instructions are performed by a computer or a processor, the computer or the processor performs the steps shown in FIG. 1 to FIG. 4.

System Embodiments

A safe handover system is provided according to an embodiment of the present invention, and can be used for realizing the method described in the above-mentioned method embodiments.

Figure 5:
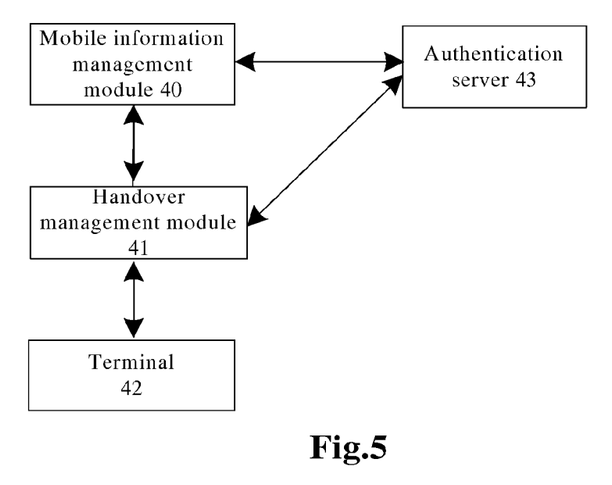
FIG. 5 is a brief structural block diagram of the safe handover system according to an embodiment of the present invention.

FIG. 5 is a brief structural block diagram of the safe handover system according to an embodiment of the present invention; as shown in FIG. 5, the safe handover system comprises a mobile information management module 40, a handover management module 41, a terminal 42 and an authentication server 43, and the detailed description for each module is given hereinafter.

The mobile information management module 40 is connected with the handover management module 41 and the authentication server 43, and is configured to obtain the safety parameters needed for authentication from the authentication server 43 during network attachment and network handover processes of the terminal 42, and to obtain the permanent/temporary and local/mobile network location information of the terminal 42 and the network attachment information of the terminal 42. The mobile information management module 40 can be positioned in a visited network and/or a home network.

The handover management module 41 is connected with the mobile information management module 40, the terminal 42 and the authentication server 43, and has a handover decision function, a two-layer handover control function, a three-layer handover control function and a mobile user terminal network information function. Therefore, the handover management module 41 can be used in network resource negotiation, handover decision triggered by the network and handover operation triggered by the terminal.

The authentication server 43 is connected with the mobile information management module 40 and the handover management module 41, and is configured to store the initial safety parameters which are identical with that of the terminal 42, such as authentication information and the like.

During the network handover process of the terminal 42, a safety mechanism needs to be established firstly between the terminal 42 and the handover management module 41, and the establishment of the safety mechanism needs the handover management module 41 to obtain the safety parameters which are identical with the safety parameters of the terminal 42 from the authentication server 43. The handover management module 41 can directly or indirectly (that is, the safety parameters are firstly obtained from the authentication server 43 by the mobile information management module 40, and then the safety parameters are obtained from the mobile information management module 40 by the handover management module 41) obtain the safety parameters needed for establishing the safety mechanism from the authentication server 43; the interactive authentication between the handover management module 41 and the terminal 42 can be realized based on the obtained safety parameters, therefore the safety mechanism between the handover management module 41 and the terminal 42 can be established, and the communication safety between the handover management module 41 and the terminal 42 can be protected. Specifically, the interactive authentication process between the handover management module 41 and the terminal 42 can refer to the authentication process in the above-mentioned method embodiments, and the details will not be described herein.

Figure 6:
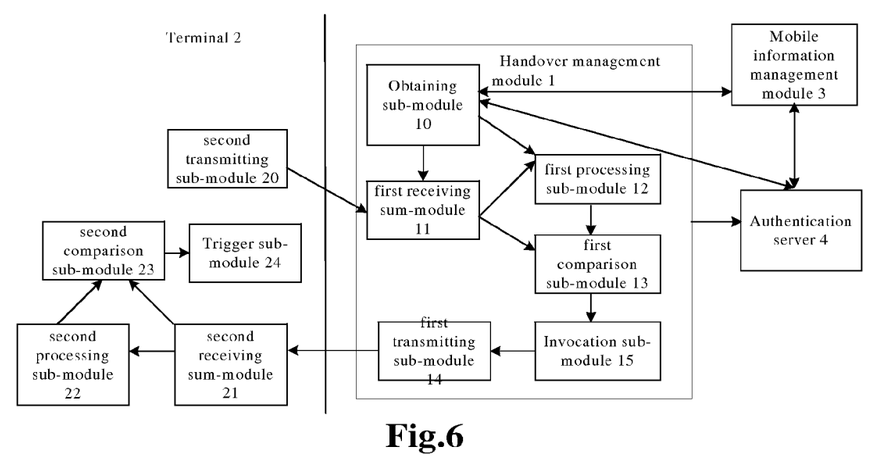
FIG. 6 is a block diagram of the safe handover system according to an embodiment of the present invention.

FIG. 6 is a block diagram of the safe handover system according to an embodiment of the present invention; as shown in FIG. 6, the safe handover system comprises a handover management module 1, a terminal 2, a mobile information management module 3 and an authentication server 4, and the connection relations between the modules are as shown in FIG. 5. In the above, the identical safety parameters are preset in the authentication server 4 and in the terminal 2, and the safety parameters needed for authentication are generated from the initial safety parameters. The safety parameters mainly comprise a cryptographic key, a cryptographic key life cycle, a cryptographic key algorithm and a cryptographic key protocol. Preferably, the safety parameters can be the safety parameters in the above-mentioned method embodiments.

As shown in FIG. 6, the handover management module 1 comprises: an obtaining sub-module 10, a first receiving sub-module 11, a first processing sub-module 12, a first comparison sub-module 13, a first transmitting sub-module 14 and an invocation sub-module 15; and the terminal 2 comprises: a second transmitting sub-module 20, a second receiving sub-module 21, a second processing sub-module 22, a second comparison sub-module 23 and a trigger sub-module 24. The detailed description for each module is given hereinafter.

In the handover management module 1, the obtaining sub-module 10 is configured to obtain the first safety parameter and the third safety parameter from the mobile information management module 3 or the authentication server 4; the first receiving sub-module 11 is configured to receive the second parameter from the terminal, wherein the second parameter comprises a first random number and a second safety parameter processed with the first random number; the first processing sub-module 12 is connected with first receiving sub-module 11 and the obtaining sub-module 10, and is configured to process the first safety parameter obtained by the obtaining sub-module 10 according to the first random number in the second parameter received by the first receiving sub-module 11; the first comparison sub-module 13 is connected with the first processing sub-module 12 and the first receiving sub-module 11, and is configured to compare the processing result of the first processing sub-module 12 with the second safety parameter processed with the first random number received by the first receiving sub-module 11; the first transmitting sub-module 14 is configured to transmitting a third parameter to the terminal, wherein the third parameter comprises a second random number and a third safety parameter processed with the second random number; the invocation sub-module 15 is connected with the first comparison sub-module 13, and is configured to enable the first transmitting sub-module 14 under the condition that the comparison result of the first comparison sub-module 13 is "identical".

In the terminal 2, the second transmitting sub-module 20 is configured to transmit the second parameter to the handover management module; the second receiving sub-module 21 is configured to receive the third parameter from the handover management module, wherein the third parameter comprise a second random number and a third safety parameter processed with the second random number; the second processing sub-module 22 is connected with the second receiving sub-module 21, and is configured to process the local fourth safety parameter according to the second random number in the third parameter received by the second receiving sub-module 22; the second comparison sub-module 23 is connected with the second receiving sub-module 22 and the second receiving sub-module 21, and is configured to compare the processing result of the second processing sub-module 22 with the third safety parameter processed with the second random number received by the second receiving sub-module 21; the trigger sub-module 24 is connected with the second comparison sub-module 23, and is configured to trigger the system to establish a safety mechanism under the condition that the comparison result of the second comparison sub-module 23 is "identical".

In the above, the first safety parameter and the third safety parameter are generated according to the initial safety parameters in the authentication server; the second safety parameter and the fourth safety parameter are generated according to the initial safety parameters in the terminal; specifically, the method for generating the safety parameters according to the initial safety parameters can refer to the corresponding descriptions in the above-mentioned method embodiments, and the details will not be described herein.

During specific implementation process, the handover management module 1 and the terminal 2 both can comprise an encryption sub-module and a decryption sub-module, wherein the encryption sub-module is configured to encrypt the data which need to be transmitted, and the decryption sub-module is configured to decrypt the received data. Preferably, the encryption sub-module and the decryption sub-module can be combined with each other, and are used for ensuring the confidentiality and the integrity of the communication data between the handover management module 1 and the terminal 2. The detailed process for ensuring the confidentiality and the integrity operation can refer to the description in the above-mentioned method embodiments, and the details will not be described herein.

Figure 7:
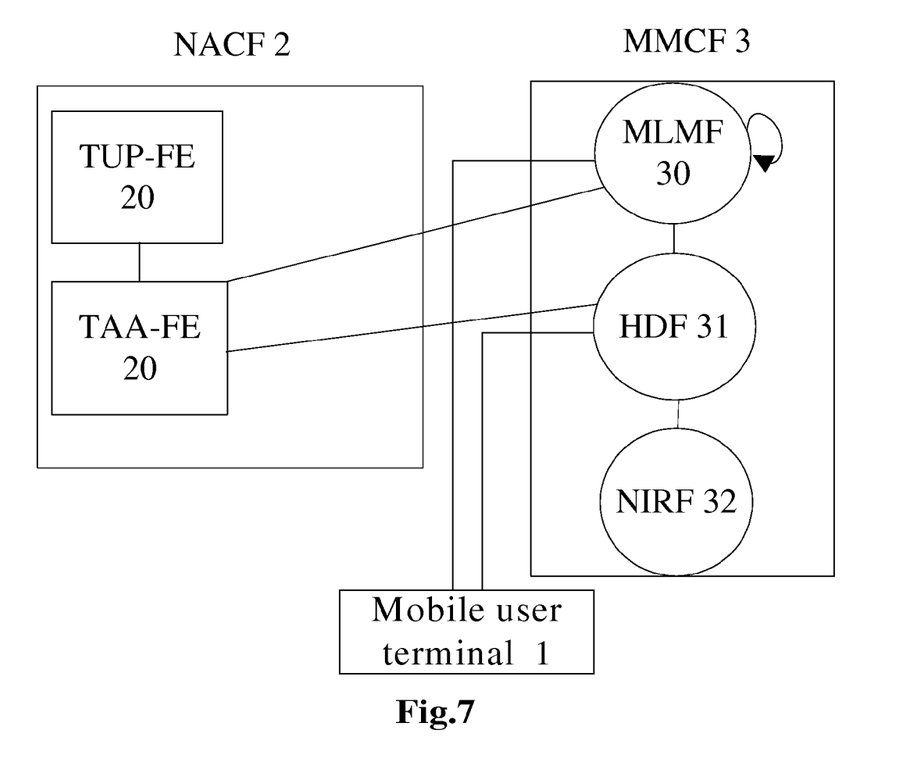
FIG. 7 is a frame schematic view of the safe handover system according to an embodiment of the present invention.

FIG. 7 is a frame schematic view of the safe handover system according to an embodiment of the present invention, as shown in FIG. 7, the system frame architecture mainly comprises a mobile user terminal 1, a network attachment control function (NACF) 2 which is configured to realize the functions of user authentication, mobile service authentication, distribution of IP address and the like, and a mobile management control function (MMCF) 3 which is configured to perform mobile management in the NGN. In the above, the NACF 2 comprises a transport user information function entity (TUP-FE) 20 which is configured to store the information of user identification, authentication data, supported authentication manner, cryptographic key and the like, and a TAA-FE 21; the MMCF 3 comprises an MLMF 30, an HDF 31 and a network information storage function (NIRF) 32 which is configured to provide neighboring network information (such as the information of strategy, handover cost and the like of the neighboring network) and to provide support for the HDF 31. In the above, the MLMF 30, the HDF 31 and the TAA-FE 21 respectively correspond to the above mobile information management module, handover decision module and authentication server.

During the network handover process of the UE, the UE needs to perform authentication with the HDF 31, and then the safety mechanism can be established to protect the communication safety between the UE and the HDF. The HDF obtains the safety parameters needed for authentication through the following two methods:

Method I, the safety parameters are obtained directly from the TAA-FE

Step 1, the HDF sends an authentication request to the TAA-FE, and the TAA-FE returns the safety parameters needed for the authentication of the HDF;

Method II, the safety parameters are obtained indirectly from the TAA-FE

Step 2, the HDF sends an authentication request to the MLMF; after obtaining the safety parameters needed for the authentication, the MLMF sends the safety parameters to the HDF.

To sum up, the handover decision module can obtain the safety parameters needed for authentication through presetting in the authentication server the initial safety parameters identical with that of the terminal; the interactive authentication process between the handover decision module and the terminal and the ensuring for the confidentiality and the integrity of the data can be realized based on the obtained safety parameters. Therefore, the problem in the prior art that the authentication between the terminal and the handover decision module can not be performed, and further the safety mechanism can not be established during the handover process of the terminal can be solved. The present invention can establish a safety mechanism between the handover decision module and the terminal to ensure the communication safety between the handover decision module and the terminal, and further ensures the safe handover of the terminal.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the program code executable by the calculating device. Consequently, they can be stored in the storage device and executed by the calculating device, or they are made into integrated circuit module respectively, or a plurality of modules or steps thereof are made into one integrated circuit module. In this way, the present invention is not restricted to any particular hardware and software combination.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all concluded in the scope of protection of the present invention.

What is claimed is:

1. A safe handover method, applied in a handover process of a terminal in a next generation network, wherein the next generation network comprises a handover management module, an authentication server and the terminal, and the method comprises:

presetting initial safety parameters in the authentication server and the terminal, and generating safety parameters from the initial safety parameters;

the handover management module obtaining the safety parameters; and the handover management module and the terminal interacting with each other by using the generated safety parameters to ensure a communication safety between the two communication parties;

wherein, the interaction performed by the handover management module and the terminal by using the generated safety parameters comprises: an authentication process interacted between the handover management module and the terminal; integrity and/or confidentiality processes interacted between the handover management module and the terminal, wherein, the authentication process between the handover management module and the terminal comprises:

the handover management module obtaining a first safety parameter from the authentication server, and transmitting a first parameter to the terminal, wherein the first parameter comprises a second random number and a first safety parameter processed with the second random number;

the terminal receiving the first parameter, and authenticating the handover management module according to a second safety parameter and the first parameter; and the handover management module authenticating the terminal according to a fourth parameter from the terminal and a third safety parameter in the handover management module under the condition that the handover management module is successfully authenticated, wherein the fourth parameter comprises a first random number and a fourth safety parameter processed with the first random number;

wherein the first safety parameter and the third safety parameter are generated according to the initial safety parameters in the authentication server, and the second safety parameter and the fourth safety parameter are generated according to the initial safety parameters in the terminal.

2. The method according to claim 1, wherein the step of the handover management module obtaining the safety parameters comprises one of the followings:
- the handover management module obtaining the safety parameters directly from the authentication server; and
- the handover management module obtaining the safety parameters from a mobile information management module, wherein the safety parameters in the mobile information management module are obtained from the authentication server.

3. The method according to claim 1, wherein the authentication process between the handover management module and the terminal comprises:
- the handover management module obtaining a first safety parameter from the authentication server, and receiving a second parameter from the terminal, wherein the second parameter comprises a first random number and a second safety parameter processed with the first random number;
- the handover management module authenticating the terminal according to the first safety parameter and the second parameter; and
- the terminal authenticating the handover management module according to a third parameter from the handover management module and a fourth safety parameter in the terminal under the condition that the terminal is successfully authenticated, wherein the third parameter comprises a second random number and a third safety parameter processed with the second random number;
- wherein the first safety parameter and the third safety parameter are generated according to the initial safety parameters in the authentication server, and the second safety parameter and the fourth safety parameter are generated according to the initial safety parameters in the terminal.

4. The method according to claim 3, wherein the process of the handover management module authenticating the terminal comprises:
- the handover management module processing the first safety parameter according to the first random number, comparing the processing result with the second safety parameter processed with the first random number in the second parameter, and under the condition that the processing result and the second safety parameter are compared to be identical, determining that the terminal is successfully authenticated.

5. The method according to claim 1, wherein the step of the terminal authenticating the handover management module comprises:
- the terminal processing the second safety parameter according to the second random number, comparing the processing result with the first safety parameter processed with the second random number in the first parameter, and under the condition that the processing result and the first safety parameter are compared to be identical, determining that the handover management module is successfully authenticated.

6. The method according to claim 3, wherein the method further comprises:
- the terminal encrypting an authentication request message according to a second safety parameter; and
- the handover management module decrypting the authentication request message according to a second parameter in a received authentication request.

7. The method according to claim 3, wherein the method further comprises:
- the terminal setting first additional data according to a second safety parameter and an authentication request message, and carrying the first additional data in an authentication request; and
- the handover management module setting second additional data according to the received second parameter and the authentication request message;
- wherein if the first additional data and the second additional data are identical, it represents that the authentication request is safe.

8. The method according to claim 3, wherein a first safety parameter, a second safety parameter, a third safety parameter, or a fourth safety parameter comprises at least one of the followings:
- a cryptographic key, a cryptographic key life cycle, a cryptographic key algorithm and a cryptographic key protocol.

9. A safe handover system, which comprises a terminal, a handover management module, a mobile information management module and an authentication server, wherein initial safety parameters are preset in the authentication server and the terminal,
the handover management module comprises:
- an obtaining sub-module, configured to obtain a first safety parameter and a third safety parameter from the mobile information management module or the authentication server;
- a first receiving sub-module, configured to receive a second parameter from the terminal, wherein the second parameter comprises a first random number and a second safety parameter processed with the first random number;
- a first processing sub-module, configured to process the first safety parameter obtained by the obtaining sub-module according to the first random number in the second parameter received by the first receiving sub-module;
- a first comparison sub-module, configured to compare the processing result of the first processing sub-module with the second safety parameter processed with the first random number received by the first receiving sub-module;
- a first transmitting sub-module, configured to transmit a third parameter to the terminal, wherein the third parameter comprises a second random number and a third safety parameter processed with the second random number; and
- an invocation sub-module, configured to enable the first transmitting sub-module under the condition that the comparison result of the first comparison sub-module is that the processing result and the second safety parameter are identical;

the terminal comprises:
- a second transmitting sub-module, configured to transmit the second parameter to the handover management module;
- a second receiving sub-module, configured to receive the third parameter from the handover management module, wherein the third parameter comprise the second random number and the third safety parameter processed with the second random number;
- a second processing sub-module, configured to process a local fourth safety parameter according to the second random number in the third parameter received by the second receiving sub-module;
- a second comparison sub-module, configured to compare the processing result of the second processing sub-module with the third safety parameter processed with the second random number received by the second receiving sub-module; and a trigger sub-module, configured to trigger the system to establish a safety mechanism under the condition that the comparison result of the second comparison sub-module is that the processing result and the third safety parameter are identical;

wherein the first safety parameter and the third safety parameter are generated according to the initial safety parameters in the authentication server; the second safety parameter and the fourth safety parameter are generated according to the initial safety parameters in the terminal.

10. The safe handover system according to claim 9, wherein the terminal and the handover management module further comprise:

an encryption sub-module, configured to encrypt data which need to be transmitted; and a decryption sub-module, configured to decrypt received data.

11. The safe handover system according to claim 9, wherein the first safety parameter, the second safety parameter, the third safety parameter, or the fourth safety parameter comprises at least one of the followings:

a cryptographic key, a cryptographic key life cycle, a cryptographic key algorithm and a cryptographic key protocol.

12. The method according to claim 4, wherein the method further comprises:

the terminal encrypting an authentication request message according to a second safety parameter; and the handover management module decrypting the authentication request message according to a second parameter in a received authentication request.

13. The method according to claim 1, wherein the method further comprises:

the terminal encrypting an authentication request message according to a second safety parameter; and the handover management module decrypting the authentication request message according to a second parameter in a received authentication request.

14. The method according to claim 5, wherein the method further comprises:

the terminal encrypting an authentication request message according to a second safety parameter; and the handover management module decrypting the authentication request message according to a second parameter in a received authentication request.

15. The method according to claim 4, wherein the method further comprises:

the terminal setting first additional data according to a second safety parameter and an authentication request message, and carrying the first additional data in an authentication request; and the handover management module setting second additional data according to the received second parameter and the authentication request message;

wherein if the first additional data and the second additional data are identical, it represents that the authentication request is safe.

16. The method according to claim 1, wherein the method further comprises:

the terminal setting first additional data according to a second safety parameter and an authentication request message, and carrying the first additional data in an authentication request; and the handover management module setting second additional data according to the received second parameter and the authentication request message;

wherein if the first additional data and the second additional data are identical, it represents that the authentication request is safe.

17. The method according to claim 5, wherein the method further comprises:

the terminal setting first additional data according to a second safety parameter and an authentication request message, and carrying the first additional data in an authentication request; and the handover management module setting second additional data according to the received second parameter and the authentication request message;

wherein if the first additional data and the second additional data are identical, it represents that the authentication request is safe.

18. The method according to claim 4, wherein a first safety parameter, a second safety parameter, a third safety parameter, or a fourth safety parameter comprises at least one of the followings:

a cryptographic key, a cryptographic key life cycle, a cryptographic key algorithm and a cryptographic key protocol.

19. The method according to claim 1, wherein a first safety parameter, a second safety parameter, a third safety parameter, or a fourth safety parameter comprises at least one of the followings:

a cryptographic key, a cryptographic key life cycle, a cryptographic key algorithm and a cryptographic key protocol.

20. The method according to claim 5, wherein a first safety parameter, a second safety parameter, a third safety parameter, or a fourth safety parameter comprises at least one of the followings:

a cryptographic key, a cryptographic key life cycle, a cryptographic key algorithm and a cryptographic key protocol.

* * * * *